United States Patent Office 3,377,326
Patented Apr. 9, 1968

3,377,326
PROCESS FOR COPOLYMERIZING OLEFINS UTILIZING VANADIUM OXYTRICHLORIDE, ALKYL ALUMINUM SESQUICHLORIDE, PHOSPHORUS TRICHLORIDE AND 2-NITROPROPANE AS CATALYST
Frederick C. Loveless, Oakland, Robert J. Kelly, Cedar Grove, and Demetreos N. Matthews, Bloomfield, N.J., assignors to Uniroyal, Inc., a corporation of New Jersey
No Drawing. Filed Aug. 26, 1963, Ser. No. 304,675
3 Claims. (Cl. 260—80.78)

ABSTRACT OF THE DISCLOSURE

In the copolymerization of alpha-monoolefins, such as ethylene and propylene, using a soluble coordination-type catalyst, such as that based on vanadium oxytrichloride and alkylaluminum sesquihalide, the activity of the catalyst is greatly enhanced by addition of phosphorus trichloride and an oxidant such as 2-nitropropane.

This invention relates to improved catalysts for the polymerization of olefins, and methods for the polymerization of olefins using these improved catalysts. More particularly the invention comprises catalysts obtained by the interaction of (1) a vanadium salt,
(2) an organometallic compound of the type represented by the formulae
 (a) RMgX (Grignard reagent), where R is a hydrocarbon radical having typically from 1 to 12 carbon atoms (for example, an alkyl radical such as methyl, ethyl, etc. or an aryl radical such as phenyl, naphthyl, etc.) and X is a halogen atom,
 (b) LiAlR$_4$, where R is as previously defined, or
 (c) R$_A$AlX$_B$, where R and X are as previously defined, A is a number from 1 to 3, B is a number from zero to 2, and $A+B=3$,
(3) a phosphorus trihalide, and
(4) an oxidant.

In the following, components 1 and 2—i.e., the vanadium salt and the Grignard reagent or the organoaluminum compound—or their interaction product, will frequently be referred to as the primary catalyst system, and components 3 and 4, the phosphorus trihalide and the oxidant, will sometimes be referred to as the activators.

The polymerization and interpolymerization of olefins, particularly alpha-olefins, using as a catalyst the combination of a transition element of groups IV through VIII with a metal hydride or a metal alkyl, is well know. The art is summarized by Gaylord and Mark, "Linear and Stereoregular Addition Polymers," Interscience, New York (1959), ch. VII. Hydrocarbon-insoluble (i.e., heterogeneous) and hydrocarbon-soluble (i.e., homogeneous) variations of such catalysts are known and are described in that book.

Schreyer, U.S. Patent 2,962,451, Nov. 29, 1960, describes a polymerization catalyst suitable for use in the polymerization of ethylenically unsaturated hydrocarbon monomers, which comprises the product formed by admixing a vanadium compound of the class consisting of vanadium halides, oxyhalides and alkoxides, said vanadium being at a valence state of three or above, with a compound having at least one metal-to-carbon bond of the class consisting of alkylaluminum halides and metal alkyls wherein the metal is aluminum, tin, or lithium-aluminum, said compound being admixed in sufficient quantity to reduce the vanadium compound at least in part to a valency below three.

British Patent 886,368, United States Rubber Company, published Jan. 3, 1962, describes hydrocarbon-soluble catalysts comprising admixtures of one molar proportion of a vanadium compound selected from vanadium tetrachloride (VCl$_4$) and pervanadyl trichloride (VOCl$_3$) with more than five molar proportions of one or more organo-aluminum compounds having the formula AlR'$_n$X$_{3-n}$ in which $n$ is an integer from 1 to 2 inclusive, R' is a radical from the group consisting of saturated alkyl, aryl, alkaryl, and hydrocarbon radicals, and X is Cl or Br. These catalysts are used for the preparation of rubbery high polymers by the copolymerization of ethylene with another alpha-olefin.

Hagemeyer and Edwards, U.S. Patent 2,917,500 (assigned to Eastman Kodak), describe a catalyst for the polymerization of 1-olefins comprised of aluminum powder, an antimony or phosphorus halide, and a titanate Ti(OR)$_4$.

Copending application Ser. No. 304,597 of F.C. Loveless filed of even date herewith, discloses that the addition of a phosphorus trihalide (3) to a catalyst based on (1) a vanadium salt and (2) an organo-metallic reducing agent greatly enhances the value of the catalyst.

Copending applications Ser. No. 304,692 of D. N. Matthews (now abandoned in favor of continuation-in-part application Ser. No. 441,358 filed Mar. 19, 1965), Ser. No. 304,691 of R. J. Kelley (now abandoned in favor of continuation-in-part application Ser. No. 441,306 filed Mar. 19, 1965), Ser. No. 304,634 of H. K. Garner and D. N. Matthews, and Ser. No. 304,647 of F. C. Loveless, all filed of even date herewith, disclose that the addition of certain activating substances greatly enhances the value of catalysts based on a vanadium salt and an organo-metallic compound.

The present invention is directed to a novel improvement in polymerization catalysis, involving a catalyst prepared from the ingredients described under (1), (2), (3) and (4), above. The invention is based upon the discovery that the addition of (3) a phosphorus trihalide such as phosphorus trichloride, phosphorus tribromide or phosphorus triiodide, and (4) an oxidant such as oxygen or an oxidizing agent such as organic and inorganic peroxides or hydroperoxides, N-oxides, or the activators disclosed in the previously mentioned copending applications to catalyst systems based on (1) and (2) as described above, makes possible a synergistic improvement in the catalyst system in the form of increased yields of polymer and/or decreased polymerization time and/or longer catalyst life.

The oxidant which is employed to produce a synergistic enhancement of the catalyst along with phosphorus trihalide in accordance with the invention may be an inorganic oxidizing agent, or an organic oxidizing agent. Oxygen itself is suitable. Among the inorganic oxidizing agents may be mentioned, in addition to oxygen itself, such substances as iodine and hydrocarbon-soluble salts of transition metals in a valence state of at least +3, such as manganese, chromium, iron, cobalt, or titanium halides. Other oxidizing agents that may be mentioned are the organic peroxides such as peracids, peresters, alkyl or aryl peroxides, aroylperoxides, and acyl peroxides, such as perbenzoic acid and its esters, dicumyl peroxide, benzoyl peroxide, acetyl peroxide, di-tertiary butyl peroxide, and the like, and organic hydroperoxides such as alkyl and acyl hydroperoxides, such as cumene hydroperoxide, etc. Preferred oxidizing agents useful as activators in the invention include the N-oxides, whether alkyl or aryl, as diethyldodecylamine-N-oxide, pyridine-N-oxide, dimethylaniline-N-oxide, and the like. Particularly important oxidants useful in the invention include, as indicated, the activators of the previously mentioned copending applications the disclosures of which are hereby incorporated herein by reference. Thus, there may be mentioned organic nitrates, nitrites and azoxy compounds, of which typical examples are such alkyl nitrates as butyl and iso-amyl nitrates, such alkyl nitrites as iso-amyl nitrite, azoxy compounds such as azoxybenzene, and so on, polyvalent iodine compounds such as iodosobenzene, iodosobenzene diacetate, iodoxy benzene, and similar organic iodine compounds, oil-soluble organic compounds of polyvalent metals among which may be mentioned cobalt (III), ferric, manganese (III), and chromium (III) acetylacetonates, t-butyl chromate, ferric dichlorobenzoate, etc., organic disulfides, especially alkyl disulfides, such as n-butyl disulfide and the like. Also of interest are the nitroso compounds of which typical examples are aryl nitroso compounds such as p-nitrosodimethylaniline (also called p-dimethylaminonitrosobenzene), 4-nitrosodiphenylamine, nitrosobenzene, o-nitrosotoluene; N-nitroso-compounds such as N-nitrosoamines including N-nitrosodiphenylamine, N-nitroso-N-methylaniline; N,4 - dinitroso-N-methylaniline, and the like. Similarly, the quinones, of which examples are p-benzoquinone, tetrachloro-p-benzoquinone (chloranil), 1,4-naphthoquinone 2,6-naphthoquinone, 2,3-dichloronaphthoquinone, 9,10-anthraquinone, and substitution products of these; beta-methylanthraquinone, and 1,2-quinones, such as acenapthenequinone and phenanthrenequinone, and the like. There may also be used such oxidants as organic nitro compounds, including for example nitroalkyl compounds, such as nitromethane, nitroethane, 2-nitropropane, etc., dinitroalkanes (e.g. 3,5-dinitroheptane, 2,2-dinitropropane), trinitroalkanes (e.g., 2,2,4-trinitrohexane), and the like, nitroaryl compounds such as nitrobenzene, m-dinitrobenzene, trinitrotoluene, etc. Sulfur is also an effective activating oxidant for the present purpose.

The olefins which are polymerized by the present process include ethylene, propylene and similar alphaolefins having the formula $CH_2=CHR$ in which R is hydrogen or a hydrocarbon radical, particularly a saturated alkyl hydrocarbon radical having from 1 to 8 carbon atoms (including, e.g., butene-1; hexene-1; 4-methylpentene-1; 5-methylhexene-1; 4-ethylhexene-1).

A preferred form of the invention is directed to the copolymerization of ethylene and propylene to yield rubbery products, and an especially preferred practice of the invention contemplates the production of unsaturated, sulfur-vulcanizable, rubbery terpolymers of ethylene and propylene and a diene such as dicyclopentadiene, methylcyclopentadiene dimer, 1,4-hexadiene, 11-ethyl-1,11-tridecadiene, 1,9-octadecadiene, bicyclo[3.2.1]octadiene-2,6 1,5-cyclooctadiene, or other suitable dienes such as are disclosed in British Patent 880,904 of Dunlop Rubber Co., Oct. 25, 1961, U.S. Patents 2,933,480, Gresham and Hunt, Apr. 19, 1960, and 3,000,866, Tarney, Sept. 19, 1961, and Belgian Patents 623,698 and 623,741 of Montecatini, Feb. 14, 1963, the disclosures of which are hereby incorporated herein by reference. Preferred terpolymers contain from about 1 to about 25% (more preferably about 2 to about 15%) by weight of dicyclopentadiene or the like; the remaining portion of the interpolymer frequently contains from about 30% to about 80% and preferably from about 40% to about 70% by weight of propylene, the remainder being ethylene.

Considering in more detail the primary catalyst system which is improved with phosphorus trihalide and oxidant in accordance with the method of the invention, such primary catalyst system comprises, as indicated previously, (1) a vanadium salt and (2) a Grignard reagent or organoaluminum compound. Among the vanadium salts which may be used there may be mentioned vanadium halides, oxyhalides, alkoxides and acetylacetonates. Specific examples of these salts are vanadium dichloride, vanadium trichloride, vanadium tetrachloride, vanadium tetrabromide, vanadium oxydichloride, vanadium oxytrichloride, alkyl vanadates (especially where the alkyl group contains 1-12 carbon atoms, e.g., n-butyl vanadate) vanadyl or vanadium acetylacetonate, and the like, as well as salts based on mixtures of more than one of the foregoing types, such as dialkyl halovanadates (e.g., dibutyl chlorovanadate) and alkyl dihalovanadates (e.g. butyl dichlorovanadate). In many cases preferred vanadium compounds are vanadium oxytrichloride, vanadyl or vanadium acetylacetonate, lower alkyl vanadates (alkyl groups of 1-4 carbon atoms) and halovanadates, especially chlorovanadates (mono- and dichloro). Such a vanadium compound (1), is combined with an organometallic compound (2) to give the primary catalyst system. Unfortunately such a conventional primary catalyst system, as indicated above, is frequently not as effective as would be desired, and may soon become inefficient or inactive. The present invention is based on the surprising discovery that the primary catalyst system is made more effective, maintains its activity for a longer period, or can be reactivated after it begins to slow down, if there is added to it (3) a phosphorus trihalide and (4) an oxidant. The benefits of the use of phosphorus trihalide and oxidant in accordance with the invention are especially important in making ethylene-propylene and ethylene-propylene-diene interpolymer, since such interpolymerization is in general much more difficult to effect efficiently than the simple homopolymerization of ethylene.

The preferred primary catalyst system for use in the present invention is the soluble (i.e., soluble in organic hydrocarbon solvents, including the monomers to be polymerized) catalyst formed by interaction of vanadium oxytrichloride and an alkylaluminum halide, in which category we include mixtures of alkylaluminum halides, such as may be formed by admixing dialkylaluminum monohalide with monoalkylaluminum dihalide, or even by mixing trialkylaluminum with aluminum trihalide. In such a preferred soluble primary catalyst system, the molar ratio of aluminum to vanadium is at least 5:1, and preferably at least 10:1; higher ratios such as 20:1, 35:1, 50:1, or even higher, may also be used. These preferred soluble primary catalyst systems are remarkable for their ability to form an amorphous rubbery ethylene-propylene interpolymer, and particularly for their ability to form an amorphous ethylene-propylene-diene interpolymer that is sulfur-vulcanizable to yield a high quality rubber stock. In preferred $R_AAlX_B$ compounds R is a lower alkyl (1 to 4 carbon atoms) and X is chlorine.

If desired even higher ratios of aluminum to vanadium (e.g. 200:1 or higher) may be employed, especially in those cases where the concentration of vanadium compound used is very small.

However, if desired, with certain catalyst combinations, relatively low ratios (e.g., 1:1) of aluminum to vanadium may be used in the invention.

It will be understood that the type formula $R_AAlX_B$ used to describe the typical organoaluminum compounds is simply an empirical formula intended to include any of a wide variety of compounds or mixtures of compounds that might result for example from bringing together trialkylaluminum compounds, aluminum trihalides and/or alkylaluminum halides. For example, equimolar mixtures of monoalkylaluminum dihalide and dialkylaluminum monohalide, or equimolar mixtures of trialkylaluminum and aluminum trihalide, may be regarded as producing the alkylaluminum sesquihalide ($R_3Al_2X_3$, which may be written empirically as $R_{1-1/2}AlX_{1-1/2}$). A mixture of trialkylaluminum and dialkylaluminum monochloride may be regarded as providing a material of the type $R_5Al_2Cl$ or empirical formula $R_{2-1/2}AlCl_{1/2}$. It should be noted that the type formula $R_AAlX_B$ as defined permits the use of trialkylaluminum as such, but not aluminum trihalide as such.

Particularly useful organoaluminum compounds are the alkylaluminum compounds, in which category we include alkylaluminum halides.

Although the soluble catalyst compositions have been described as preferred, especially in the interpolymerization of ethylene and propylene, it will be understood that in other cases, notably the homopolymerization of propylene, the insoluble or heterogeneous type of catalyst is used.

The amount of phosphorus trihalide employed in accordance with the invention is in general not especially critical. Surprisingly small amounts of activator, e.g., about 0.1 to 0.5 mole of phosphorus trihalide per mole of vanadium compound, may be sufficient in many cases to produce a noticeable effect. Usually it is preferred to use somewhat larger amounts, typically about 5 to 20 moles of phosphorus trihalide per mole of vanadium, but it will be understood that considerably more activator than this may be employed if desired. Ordinarily there is little or no proportionate added advantage, as far as activating effect is concerned, in using appreciably more than about 20–30 moles of phosphorus trihalide per mole of vanadium and for reasons of economy we generally do not use more than this amount, although we desire to emphasize that there is no critical upper limit on the amount that can be employed. Thus, indefinitely larger amounts of phosphorus trihalide, e.g., 500–600 moles or even more, can be employed, although there is no added advantage in so doing, and ordinarily such large amounts would be avoided as unnecessary if not wasteful. The optium amount of phosphorus trihalide in any given case will depend upon the specific composition of the primary catalyst, as well as such variables as the exact polymerization procedure.

The phosphorus trihalide may all be introduced at the start, or it may be introduced continuously or in increments as the polymerization proceeds. The phosphorus trihalide is combined with the primary catalyst ingredients in the absence or the presence of the monomers to be polymerized. A preferred procedure involves first combining the primary catalyst ingredients in the presence of at least a portion of the monomer(s), and immediately adding the phosphorus trihalide, followed by the oxidant.

The amount of oxidant employed may vary widely, depending on other details of the process; in some cases very small amounts, e.g., about 0.1 mole of oxidant per mole of vanadium compound, is sufficient to produce a synergistic effect. In most cases it is preferred to use somewhat more, say from about 1 to about 2 moles of oxidant per mole of vanadium, but larger amounts may also be employed. Thus, there may be used 3–5 moles of oxidant. Ordinarily there is little or no proportionate added advantage in using still higher amounts, and we do not generally use appreciably more than 5 moles, if for no other reason than economy. Thus, amounts of oxidant as great as about 10 moles (per mole of vanadium) or even more can be used, but ordinarily any substantially larger amounts would be unnecessary if not wasteful, and would generally be avoided. In any case, the molar amount of oxidant of course does not exceed the molar amount of organometallic compound. The optimum amount of oxidant will depend, in any particular case, upon the specific composition of the primary catalyst, and the specific oxidant, as well as such variables as the amount of phosphorus trihalide, and the exact procedure employed. More than one oxidant may be used if desired.

We prefer to introduce the oxidant continuously or in increments, as the polymerization proceeds, rather than all at once. The oxidant may be combined with the other catalyst ingredients before introduction of monomer, but the preferred procedure, in which the two primary catalyst ingredients are combined in the presence of monomer before adding the activators, avoids undesired interaction between the aluminum or vanadium compound and such oxidants as nitro, nitroso, and azoxy compounds. The best results are obtained if the primary catalyst ingredients and the phosphorus trihalide are mixed in the presence of the monomers, followed by addition of the oxidant.

The process is conveniently carried out in a solvent although an added solvent is not essential; the monomers being polymerized can serve as the solvent. In general, the normal solvents for Ziegler-type coordination polymerization can be used. These include the aromatic hydrocarbons, aliphatic hydrocarbons, chlorobenzene, tetrachloroethylene, and any other solvents which will not destroy the catalyst. Furthermore, the procedure may otherwise be the same as in conventional practice as far as such details as temperature of polymerization, pressure, concentration of catalyst, and the like, are concerned.

One preferred practice of the invention contemplates continuously (1) interpolymerizing ethylene, propylene and a diene such as dicyclopentadiene, for example, by introducing the mixture of monomers into a first polymerization zone wherein it is combined with at least a portion of each of the catalyst ingredients and (2) withdrawing a stream containing at least a portion of terpolymer from said zone, and (3) repeating steps (1) and (2) in one or more subsequent polymerization zones, into which the reaction stream withdrawn from the previous polymerization zone is introduced successively. There may be introduced incrementally or continuously into each zone more catalyst ingredients, as required, to maintain the system at peak efficiency consistent with economical utilization of catalyst. More of one or more of the monomers may be introduced in such subsequent reaction zones, if desired. The stream issuing from the final reaction zone, in the form of a thick solution usually called a cement, may be processed in the usual way to separate the polymer and remove catalyst residues.

Schreyer, in U.S. Patent 2,962,451, teaches catalysts made by mixing a vanadium compound in which the vanadium is in a higher state of valence, that is +3 or higher, with an organometallic compound in amount sufficient to reduce the vanadium at least in part to a valence state of less than +3. While such a catalyst may be activated in accordance with the present invention it is desired to point out that it is not essential for purposes of the invention that the vanadium compound employed have a valence of at least +3. On the contrary, vanadium compounds in which the vanadium has a valence of less than +3, such as vanadium dichloride, may be used. However, it will be understood that in that case the product obtained by mixing the vanadium compound with the organometallic compound is not an active catalyst until the activating substance of the invention is added. This is in contrast to the product obtained by mixing a vanadium +3 compound with the organometallic compound, which product is an active catalyst even before the activator is added. Although vanadium compounds in which the vanadium has a valence of less than +3 may be used in the invention, it is preferred to use vanadium compounds in which the vanadium has a valence of at least +3; such compounds are particularly advantageous from the standpoint of the described continuous polymerization procedure in which the catalyst is introduced into a first polymerization zone without activator, and the activator is added subsequently after a certain amount of polymerization has taken place.

Perhaps the most remarkable feature of the invention resides in the fact that the use of both phosphorus trihalide and the oxidant along with the primary catalyst ingredients makes possible improved results over and above the results associated with the use of phosphorus trihalide or oxidant individually as supplements to the primary catalyst system, that is, the use of phosphorus trihalide in combination with oxidant as described is capable of effecting synergistic improvement, by which we mean an improvement that is greater than the improvement obtainable with either additive alone.

The following examples will serve to illustrate the practice of the invention in more detail.

Example I

A dry, 2-liter, 3-necked flask was equipped with stirrer, thermometer, gas inlet tube, and a vertical condenser mounted with a gas outlet tube. The flask was kept filled with a dry argon atmosphere prior to polymerization. Into this flask was introduced 700 ml. of pure n-heptane. The solvent was then saturated with ethylene and propylene with a continuous flow of 2 liters of each gas per minute, for ten minutes. The gas flow is then maintained at that level for the duration of the polymerization (which is conducted at ambient temperature).

In a separate flask, 2.0 millimoles of $Et_3Al_2Cl_3$ (as 13.4 ml. of heptane solution) and 0.2 millimole of $VOCl_3$ (as 8 ml. heptane solution) were mixed and aged 20 minutes. Then one-half (10.7 ml.) of this premixed soluble catalyst mixture is added to the monomer solution. No exotherm occurs. Then 0.1 millimole of $C_2H_5NO_2$ is added. An immediate exotherm is observed. After one minute, 1 ml. of $PCl_3$ is added to the reaction mixture and the rate of exotherm increases. The polymerization is allowed to proceed for 30 minutes and the reaction mixture is then quenched by addition of 15 ml. of isopropanol. The solution of polymer is called a cement. Twenty ml. of a 5% toluene solution of an antioxidant [e.g., 2,2'-methylene-bis(4-methyl-6-tert-butylphenol)] is next added to the polymer cement. The cement is clear and contains no insoluble polymer. The polymer is flocculated by pouring the cement, with stirring, into a 50/50 (by volume) methanol-acetone mixture. The precipitated polymer was isolated and dried. The intrinsic viscosity of the polymer (all intrinsic viscosities herein are determined in tetralin at 135° C.) is 2.08; the propylene content of the polymer is 47% by weight. The yield is 17.6 grams, considerably larger than the yield of only about 3.0 grams expected when no $C_2H_5NO_2$ or $PCl_3$ is added, in an otherwise similar preparation. If the $PCl_3$ alone is added the yield is only 14.7 grams.

Example II

This example is designed to compare the effectiveness of $PCl_3$, of 2-nitropropane, and of a $PCl_3$-nitropropane combination, under comparable conditions. The combined use of nitropropane and $PCl_3$, to be described, is shown to be superior to the use of either reagent alone.

(A) A blank run for the series is described here. The apparatus is as described in Example I; the solvent (700 ml. of benzene) was saturated (at 2 liters per min. of each) with ethylene and propylene (this flow was continued throughout the run). Then, 1.0 mmole of $Et_3Al_2Cl_3$ and 0.1 mmole of $VOCl_3$ were added to the reaction flask, in that order. Immediate exotherm occurs on addition of $VOCl_3$. The polymerization was allowed to proceed for 30 minutes and then quenched with alcohol; antioxidant was added and the polymer was isolated by flocculating in methanol. The yield was 10.8 g.; intrinsic viscosity, 1.67; wt. percent of propylene, 55.

(B) This run was identical to A except that 0.1 mmole of 2-nitropropane was added ten minutes after polymerization had started. By this time the initial exotherm had subsided and the reaction mixture was cooling, but addition of the oxidant caused a second exotherm. Thirty minutes from the initial catalyst addition, the run was quenched, and worked up as before. The yield (13.6 g.) shows the benefits of adding such oxidants after polymerization has subsided. The intrinsic viscosity was 1.36 and the wt. percent propylene, 52.

(C) This run was identical to A except that 1.0 mmole of $PCl_3$ was added ten minutes after polymerization had started. The cooling rate of the reaction mixture slowed considerably, showing an increase in polymerization rate. The reaction was quenched after 30 minutes (from initial catalyst addition) and worked up as usual. The yield was 17.4 g., demonstrating that the addition of $PCl_3$ markedly increases the yield over that in the blank run. The intrinsic viscosity was 1.82 and the wt. percent propylene, 49.

(D) This run was identical to A except that 0.1 mmole of 2-nitropropane and 1.0 mmole of $PCl_3$ were added (in that order), 10 minutes after polymerization started, a second exotherm being observed. From the reaction mixture, worked up in the same way as the others, 19.0 grams of polymer were recovered. This demonstrates that the combination of nitroalkane and $PCl_3$ is more beneficial to the yield than either reagent alone. The intrinsic viscosity was 1.49 and the wt. percent propylene, 53.

Example III

This example illustrates the use of $PCl_3$-and-oxidant combination with premixed $EtAlCl_2$-$(BuO)_3VO$ catalyst.

A premixed catalyst was prepared by mixing 6.0 mmoles of $EtAlCl_2$ with 0.3 mmole of butyl vanadate. Then, in the usual apparatus, 700 ml. of benzene were saturated with ethylene and propylene, at 2 liters per minute of each. Premixed catalyst equivalent to 2.0 mmoles of $EtAlCl_2$ and 0.1 mmole of butyl vanadate was added. There was no exotherm. Then 0.1 mmole of $EtNO_2$ and 0.5 mmole of $PCl_3$ were added, in that order. A ninteen-degree exotherm occurred and the polymerization was allowed to proceed for 30 minutes, then quenched and worked up as usual. The yield was 18.8 g. The yield of polymer from a comparable run using fresh catalyst (prepared in the presence of monomer) with no $EtNO_2$ or $PCl_3$ was 14.5 grams.

Example IV

This procedure involved premixed catalyst as described in Example I. This premixed catalyst was added to the monomer solution. Then 1.0 mmole $PCl_3$ was added to the solution. After one minute, a dropwise addition of a solution of 0.1 mmole pyridine N-oxide (in 60 ml. of heptane) was started. The oxidant was added over the course of the first 20 minutes of the polymerization. The yield was 25.7; the intrinsic viscosity was 1.90; the propylene content of the ethylene-propylene copolymer was 48%.

Example V

This example is identical to Example IV except that the oxidant is 0.1 millimole of nitrobenzene, added over the first 20 minutes of the polymerization. The yield is 21.5 grams; intrinsic viscosity is 3.08; propylene content is 50% by weight.

Example VI

This example is identical to Example V except that the oxidant is 0.1 millimole of 2-nitropropane, added dropwise over the first 20 minutes. The yield is 25.8 grams, the intrinsic viscosity is 2.16 and the propylene content is 43% by weight.

Example VII

This example is identical to Example VI except that the oxidant is 0.1 millimole of beta-methylanthroquinone, added dropwise over the first 20 minutes. The yield is 20.0 grams, the intrinsic viscosity is 3.53 and the wt. percent propylene is 41.

Example VIII

This example shows polymerization with the primary catalyst and phosphorus trihalide until some of the monomers have been converted to polymer, after which oxidant is added to produce still more polymer.

Into the apparatus described in Example 1 is placed 700 ml. of dry benzene. The solvent is saturated with a feed of 2 liters per minute each of ethylene and propylene at atmospheric pressure and ambient temperature. This feed is continued during the polymerization. One millimole of ethyl aluminum sesquichloride, 1 millimole of phosphorus trichloride, and 0.1 millimole of pervanadyl chloride are introduced into the flask in that order. A temperature rise of 20° takes place within 5 minutes, indicating rapid polymerization. At the end of 10 minutes dropwise addition of 0.1 millimole of 2-nitropropane in 50 ml. of heptane is begun, and continued for the next 10 minutes. The reaction is halted and the polymer is recovered as in Example I. The yield is 28.6 grams, the intrinsic viscosity is 1.19, and the wt. percent propylene is 54.

This procedure is particularly preferred because of the exceedingly high yields obtainable.

In a similar manner the method of the invention may be applied to catalyst systems produced from other vanadium compounds such as vanadium dichloride, vanadium trichloride, vanadium tetrabromide or tetrachloride, pervanadyl acetylacetonate, vanadium acetylacetonate, dibutyl chlorovanadate, butyl dichlorovanadate, and the like.

Similarly, other alkyl aluminum halides such as diethyl aluminum monochloride or monoethyl aluminum dichloride may be substituted in the foregoing examples. In place of using alkyl aluminum halides or trialkyl aluminum as the organometallic component of the primary catalyst system in practicing the invention, there may be employed Grignard reagents as represented by phenyl magnesium bromide, ethyl magnesium chloride, and the like, or lithium aluminum tetraalkyls, such as lithium aluminum tetraethyl or the like. Similarly, the system of Carrick (tetraphenyltin-aluminum halide-vanadium compound) may be used as a means of providing in situ a combination of organo aluminum halide and vanadium compound for activation in accordance with the method of the invention.

Similarly, other oxidants may be employed, including oxygen itself, iodine, salts of transition metals (valence +3 or more) such as manganese, chromium, iron, cobalt or titanium halides, perbenzoic acid and its esters, dicumyl peroxide, benzoyl peroxide, acetyl peroxide, di-tertiary butyl peroxide, cumene hydroperoxide, diethyldodecylamine-N-oxide, dimethylaniline-N-oxide, butyl and iso-amyl nitrates, iso-amyl nitrite, azoxybenzene, iodosobenzene, benzene diacetate, iodoxybenzene, cobalt (III), ferric manganese (III), and chromium (III) acetylacetonates, t-butyl chromate, ferric dichlorobenzoate, n-butyl disulfide, p-nitroso dimethylaniline, 4-nitrosodiphenylamine, nitrosobenzene, o-nitrosotoluene, N-nitrosodiphenylamine, N-nitroso-N-methylaniline, N,4-dinitroso-N - methylaniline; other quinones such as benzoquinone, tetrachloro - p-benzoquinone, 1,4-naphthoquinone, 2,6-naphthoquinone, 2,3-dichloronaphthoquinone, 9,10 - anthraquinone, acenaphthenequinone, phenanthrenequinone and the like, other organic nitro compounds such as nitromethane, dinitrobenzene and the like, as well as sulfur.

Example IX

Example VIII may be repeated, except that the ethylene and propylene may be copolymerized in the presence of 1.5 milliliters of dicyclopentadiene. Unsaturated sulfur-vulcanizable rubbery terpolymer of ethylene-propylene-dicyclopentadiene is obtainable in good yield (iodine number of, for example, 11.5).

Having thus described our invention, what we claim and desire to protect by Letters Patent is:

1. In a method for copolymerizing ethylene and propylene to form an amorphous, rubbery copolymer comprising contacting the said monomers, in solution in a solvent medium, with a catalyst composition dissolved in said medium made by bringing together in said medium, in the presence of the monomers,
    (1) vanadium oxytrichloride,
    (2) an alkylaluminum sesquichloride in which the alkyl group has from 1 to 4 carbon atoms, and
    (3) phosphorus trichloride,
the mole ratio of aluminum to vanadium being from 5:1 to 200:1 and the amount of phosphorus trichloride being at least 0.1 mole per mole of vanadium, the said solvent medium consisting of a hydrocarbon, the improvement comprising: introducing to the monomer-catalyst mixture in measured amounts over a period of time during the polymerization reaction
    (4) 2-nitropropane, in amount of from 0.1 to 2 moles per mole of vanadium,
whereby the yield of copolymer is substantially increased.

2. A method as in claim 1 in which a copolymerizable nonconjugated diene is also present, whereby an unsaturated terpolymer is formed.

3. A method as in claim 1 in which the diene is dicyclopentadiene.

References Cited

UNITED STATES PATENTS

| | | | |
|---|---|---|---|
| 2,827,446 | 3/1958 | Breslow | 260—94.9 |
| 3,203,940 | 8/1965 | Long | 260—88.2 |
| 3,045,001 | 7/1962 | Berger | 260—94.9 |
| 3,211,709 | 10/1965 | Adamek et al. | 260—80.5 |
| 3,222,347 | 12/1965 | Farrar et al. | 260—94.3 |

FOREIGN PATENTS

| | | |
|---|---|---|
| 809,717 | 3/1959 | Great Britain. |
| 3,615,287 | 9/1961 | Japan. |

JAMES A. SEIDLECK, *Primary Examiner.*

JOSEPH L. SCHOFER, *Examiner.*

W. HOOVER, *Assistant Examiner.*

UNITED STATES PATENT OFFICE
CERTIFICATE OF CORRECTION

Patent No. 3,377,326                          April 9, 1968

Frederick C. Loveless et al.

It is certified that error appears in the above identified patent and that said Letters Patent are hereby corrected as shown below:

Column 10, line 33, "claim 1" should read -- claim 2 --.

Signed and sealed this 30th day of September 1969.

(SEAL)
Attest:

Edward M. Fletcher, Jr.                    WILLIAM E. SCHUYLER, JR.
Attesting Officer                            Commissioner of Patents